March 29, 1966 R. E. GARNER 3,242,999
METHOD AND APPARATUS FOR POSITIONING GEOPHONES
IN SUBTERRANEAN EARTH FORMATIONS
Filed Aug. 7, 1963 3 Sheets-Sheet 1

INVENTOR
ROBERT E. GARNER
BY
ATTORNEYS

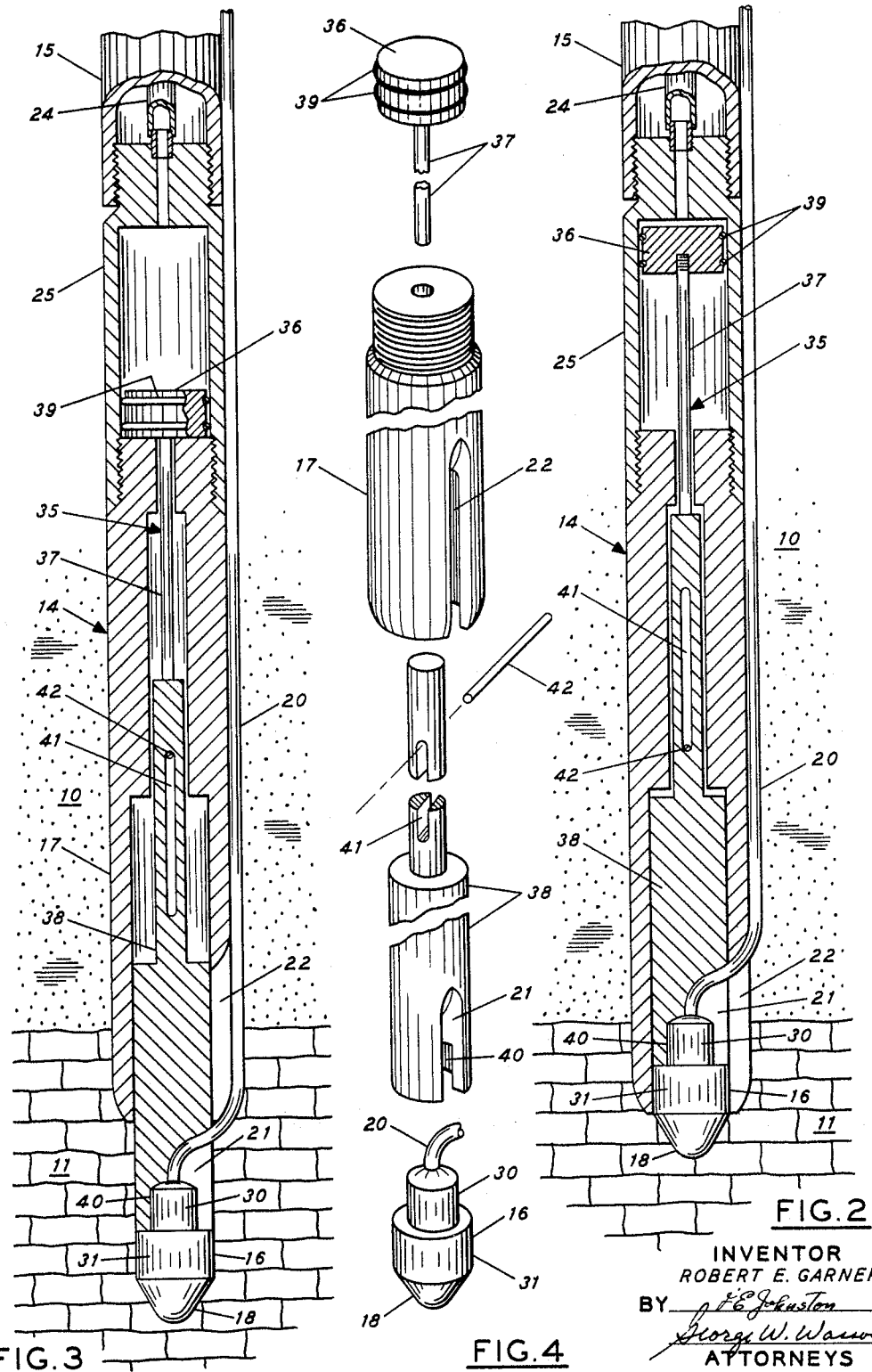

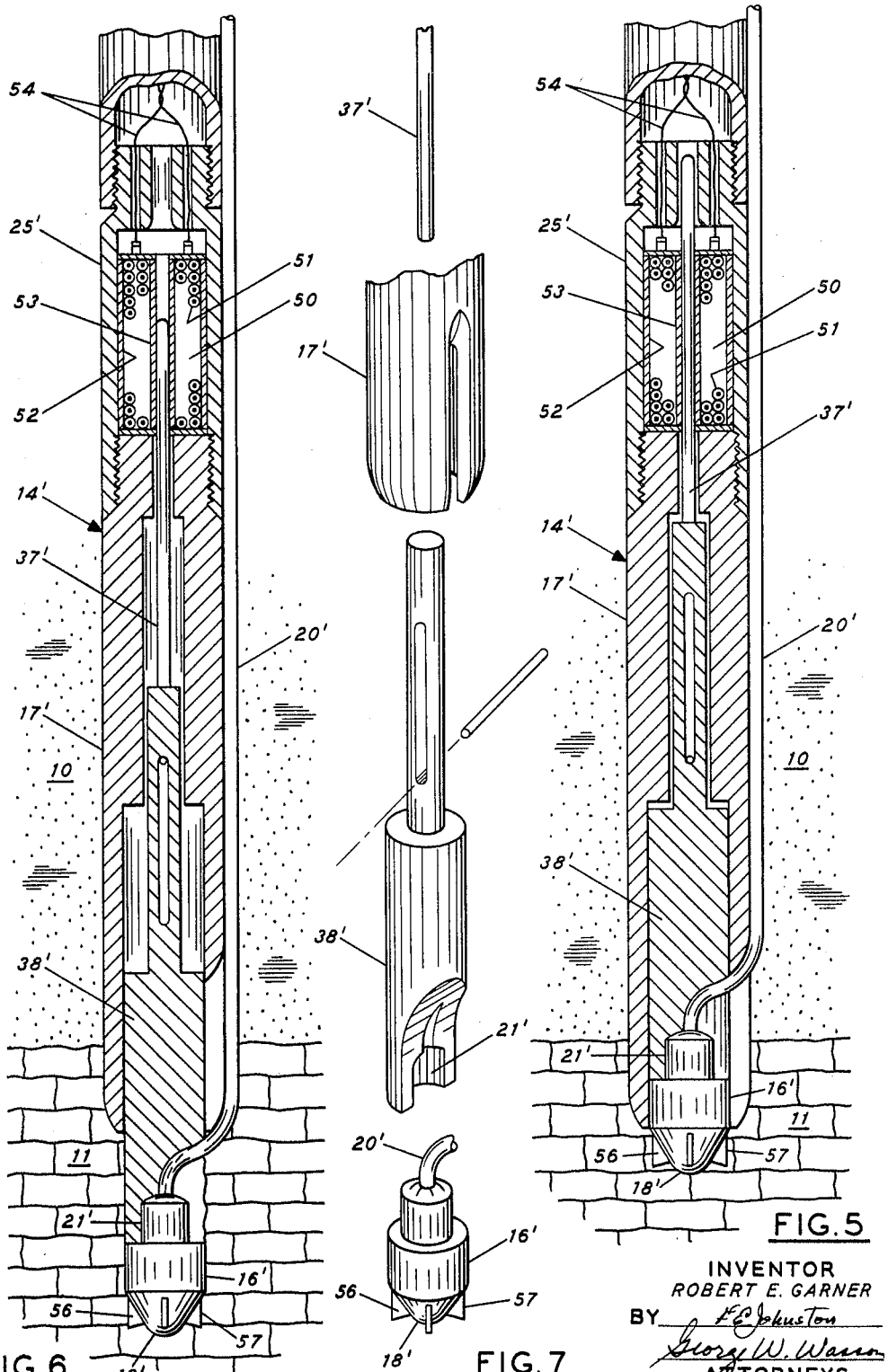

3,242,999
METHOD AND APPARATUS FOR POSITIONING GEOPHONES IN SUBTERRANEAN EARTH FORMATIONS
Robert E. Garner, Metairie, La., assignor to Chevron Research Company, a corporation of Delaware
Filed Aug. 7, 1963, Ser. No. 300,540
10 Claims. (Cl. 175—19)

This invention relates to seismic surveying. More particularly, it relates to a method and apparatus for positioning geophones in subterranean formations beneath swamps, lakes, and the like.

Seismologists prospecting for oil-bearing strata beneath swamp, lake and ocean beds have realized that efficient coupling between the earth and geophones planted near the surface of the earth must be obtained in order to produce a record of seismic waves arriving at the geophones truly representative of the waves reflected from the subterranean layers under investigation. They have also realized that the reception of reflected seismic waves is enhanced if the geophones are anchored deep beneath the floor of the swamp or body of water under investigation, within more consolidated earth formations.

Heretofore in swampy areas, such as found in the southern part of the United States, geophones have been positioned within the consolidated earth formations using a ram that is driven vertically into and out of the swamp from drive means permanently positioned at the surface of the earth. The ram in such case is usually cylindrical and frequently constitutes a pipe.

Each geophone includes a cylindrical shank connected to the interior of the ram at the lead end, and a main body portion extending beyond the ram. It is designed to be carried downward by the ram into the consolidated layer and, owing to the slide fit of the shank and the ram, to be detached from the ram at the beginning of the upstroke of the apparatus.

Among the disadvantages of such positioning apparatus are (1) inadequate mechanical support of the geophone during downward travel of the ram resulting in a build-up of sheering stresses at the attaching plane of the shank and main body and, (2) after downward travel is terminated, an inability to release the geophone from the ram to leave it positioned in the consolidated layer.

The present invention contemplates a method and apparatus for positioning geophones within subterranean strata having the advantages of increased lateral support of the geophone during downward travel and positive release of the geophone from the ram. These advantages are provided by a geophone support adapter having a recess for supporting the geophone and a piston mechanism located immediately above the geophone. In operative sequence, after the adapter has been positioned within the desired earth stratum, the geophone is expelled from the adapter by operatively connecting the piston to a fluid reservoir at the surface of the earth.

Modifications of the adapter include a solenoid operative piston mechanism to expell the geophone from the adapter, and means to rotate the adapter during its removal to assist in the release of the geophone.

The present invention will become more apparent from the following detailed description of the invention taken in conjunction with the following drawings, in which:

FIGURE 2 is a side view, partially cut away, of a geophone adapter of the apparatus of FIGURE 1, illustrating a piston for implanting a geophone within a designated earth formation;

FIGURE 3 is a side view of the adapter illustrating the piston in extended position;

FIGURE 4 is an exploded view of a portion of the adapter of FIGURES 2 and 3 rotated 90 degrees to more fully illustrate the piston and geophone;

FIGURE 5 is a side view, partially cut away, of a geophone adapter modified to increase mobility and ease of handling by the provision of a electromagnetic solenoid operatively connected to a piston;

FIGURE 6 is a side view of the modified adapter illustrating the piston in extended position; and FIGURE 7 is an exploded view of a portion of the adapter of FIGURES 5 and 6 rotated 90 degrees to more fully illustrate the piston and geophone.

Figure 1:
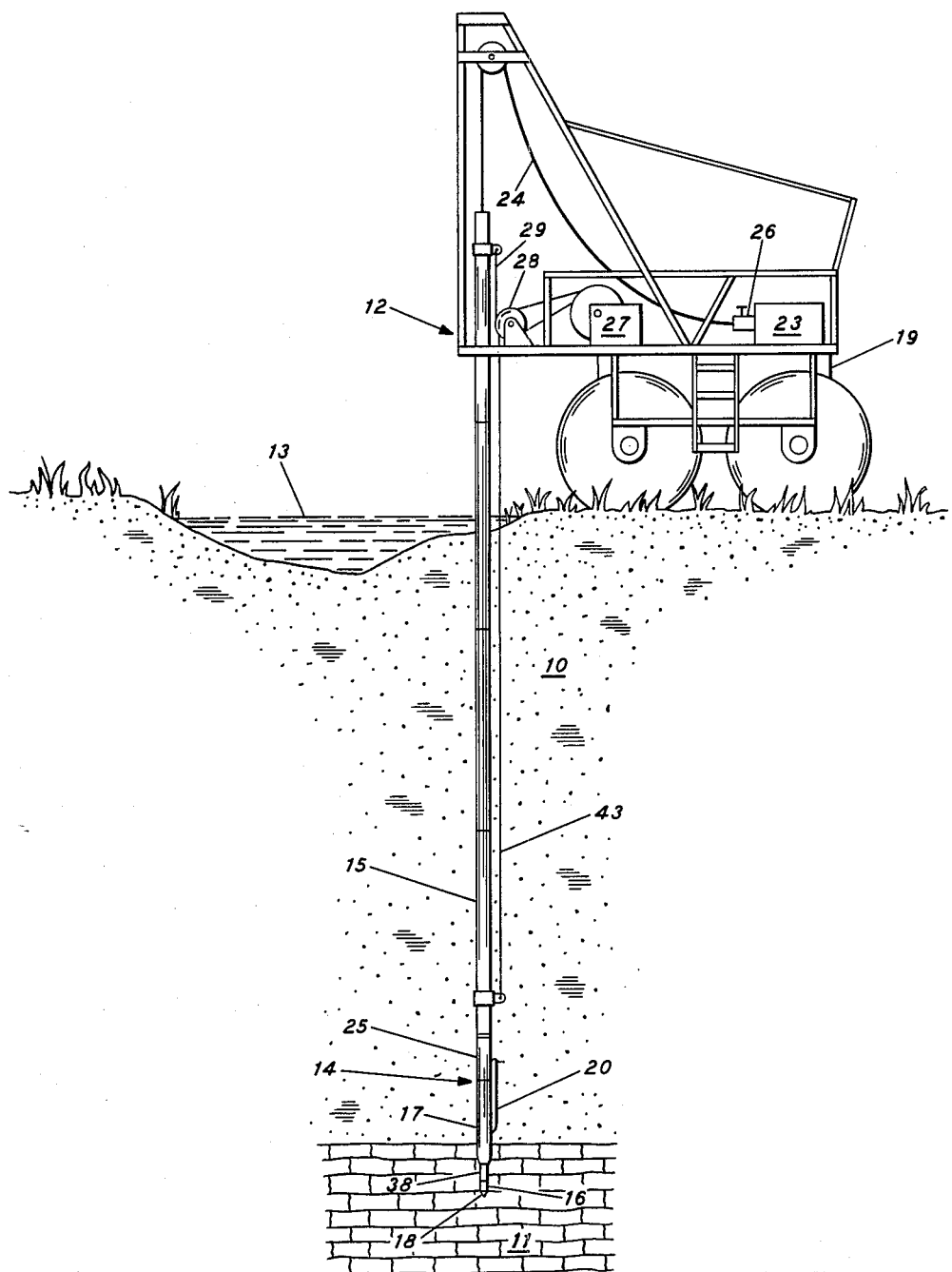
FIGURE 1 is a sectional view, partially schematic, of subterranean earth formations penetrated by a geophone positioning apparatus embodying the invention.

Referring now to the drawings, FIGURE 1 illustrates how earth formations 10 and 11 are penetrated by geophone positioning apparatus 12 according to the invention. Formation 10, called the bed mud layer, lies beneath swampy area 13 and is characterized by silt or other loose unconsolidated particles of earth suspended in water; formation 11 is called the consolidated layer and lies immediately below formation 10 and defines a layer into which the positioning apparatus must penetrate to insure adequate seismic coupling for reflections from deeper earth formations.

The apparatus used to position the geophone should be readily apparent from the following description of the method of operation of the positioning apparatus. Details of the method of operation are illustrated with reference to FIGURES 1–4.

Geophone adapter 14 constructed in accordance with the invention is first attached to the leading end of ram 15 and has geophone 16 supported within its interior. It will be noted that geophone 16, concentric with the side wall of geophone support member 17, has a conical end 18 protruding beyond the support member 17 to function as a lead point as the unit is being run through layer 10 to contact layer 11. The geophone is electrically connected to a recorder (not shown) on swamp buggy 19 by cable 20 passing through slots 21 and 22 in the adapter.

Also located on buggy 19 is a compressor 23 used in expelling the geophone from the adapter. The compressor is connected to adapter 14 by inlet hose line 24 passing through the length of ram 15 to ram support member 25. The compressor is controlled by a manually operated check valve 26 held in the closed or off position during attachment of the adapter 14 to the ram 15 and during vertical movement of apparatus 12 through the earth formations 10 and 11.

After the ram and geophone adapter are connected, with the adapter forming the lead point of the ram, the entire unit is driven into the earth formations. This is accomplished by means of winch 27 operatively connected to the ram by a sheave 28 and a cable 29. The geophone adapted and ram pass through earth formation 10 and into earth formation 11 where increased resistance to downward travel at the leading edge of the adapter may be used to indicate that downward movement of the apparatus should be terminated. Contact between the geophone and earth formations 10 and 11 is minimized during downward travel of the apparatus by supporting the geophone entirely within member 17 as shown in FIGURE 2. The geophone so supported is thereby capable of withstanding the effects of bending forces acting at the junction of shank 30 and base 31.

With the adapter in position in formation 11, the check valve 26 is then opened and fluid pressure from the compressor 23 is communicated to the face of piston mechanism 35 supported within support member 25. The fluid pressure on the piston head 36 does not escape from the member 25 because of airtight engagement between O-ring gaskets 39 located at the periphery of the piston head 36 and the side wall of member 25. Instead, the pressure on the piston head increases to a magnitude sufficient to overcome surface contact between piston mechanism 35 and the walls of members 17 and 25. In practice, the operating pressure may have to be increased if the bed mud through which the apparatus passes is fine in texture. Such mud forms, in the annular space between the piston and these members, a bond that inhibits movement.

As the pressure on the piston head increases, piston rod 37 and piston shaft 38 are moved downward relative to members 17 and 25 expelling the geophone 16 from member 17 into contact with consolidated layer 11; see FIGURE 3. The limit of movement is here determined by pin 42 contacting the end of slot 41 in piston shaft 38. At the termination of such movement, the shank 30 of the geophone still resides within recess 40 of piston shaft 38 but the base 31 is fully in contact with the consolidated soil to provide the desired efficient coupling to the formation. This contact further insures that the restraining forces of the formation will act on substantially the entire surface of the geophone when the positioning apparatus is separated from the geophone.

The geophone and shaft member are then disconnected by providing the ram with upward movement, as done by reversing the direction of rotation of winch 27 after disconnecting cable 29 and attaching cable 43 to the winch. The upward travel of the ram terminates when the adapter reaches the surface of the earth.

Inasmuch as the piston shaft and the shank member of the geophone are held in slidable contact and the geophone is rigidly connected with the formation, the geophone does not allow the adapter during upward movement but remains within the formation. Separation of the geophone and piston shaft 38 and member 17 is facilitated by slots 21 and 22 formed in these parts so that lead cable 20 is clear of the adapter on the upstroke of the ram.

A modification of the above-described apparatus and method for positioning geophones beneath the surface of the earth without the use of bulky compressors and inlet hose lines, is shown in FIGURES 5-7.

FIGURES 5 and 6 illustrate partial sectional views of geophone adapter 14' operative to expel modified geophone 16' into consolidated formation 11. For convenience of description, prime reference numbers will be used hereinafter to identify modified structures similar to those shown in FIGURES 1-4.

Referring further to FIGURES 5 and 6 in the operative sequence in accordance with the invention, electromagnetic solenoid drive means 50 is coaxially disposed within member 25'. It includes a piston rod 37' of magnectic material coaxial of core tube 53, cylindrical housing 52 and a series of helical coils 51. Coils 51 are spaced between housing 52 and core tube 53 and are connected by lines 54 to a power supply at the surface of the earth.

After the earth formations 10 and 11 have been penetrated by the positioning apparatus 12, the coils 51 are energized by connecting them with the power supply. In response to current flow through these coils, the piston rod 37' is moved downward relative to members 17' and 25' to place geophone 16' within consolidated layer 11. As shown in FIGURE 6, the extent of the downward stroke of the piston has been lengthened in the modification in order that the piston shaft 38' may extend below the end plane of member 17' at the termination of the stroke. After the geophone is placed within the consolidated formation 11, the ram is provided movement to return the ram and adapter to the surface of the earth. As the ram moves up, it may be intermittently rotated by suitable means (not shown) to break adhesive bonds (due to mud adherence) at the junction of the geophone and the piston shaft 38'. Any such rotation should be limited to 90 degrees to avoid severing the cable 20', and slot 21' is enlarged to provide for such rotary movement; see FIGURE 7.

Fins 56 are also provided on the geophone to provide a positive engagement with the formation 11 and to hold the geophone fixed as the adapter is rotated. It should be noted that each fin 56, preferably but not necessarily, has a triangular shape attached along an edge of the frusto-conical surface 18' of the geophone so that the attaching edge defines a plane coextensive with the axis of symmetry of the geophone. Sides 57 of the fins extend beyond the end 18' of the geophone and are oriented normal thereto. As the ram is rotated, these sides provide an increased surface area that inhibits rotation of the geophone.

While certain preferred embodiments of the invention have been specifically disclosed, it should be understood that the invention is not limited thereto, for many variations will be readily apparent to those skilled in the art.

The invention, therefore, is to be given its broadest possible interpretation within the terms of the following claims.

I claim:
1. Apparatus for positioning geophones within a subterranean earth layer beneath the surface of the earth, comprising in combination;
    a ram means,
    a geophone adapter fixedly attached to said ram, said adapter forming the lead edge of said ram and including a piston mechanism and first and second support members supporting said piston mechanism,
    said first support member having a recess at the end thereof within which said geophone seats, and a piston shaft means supported in contact with said geophone,
    said second support member fixedly attached to said first support member and including a piston rod and piston head means therewithin operatively connected to said piston shaft means,
    means for forcing said ram through vertical planes normal to and located below the surface of the earth,
    means for providing movement of said piston mechanism relative to said first and second support members to expel said geophone from said first support member into contact with said subterranean earth layer.

2. The apparatus in accordance with claim 1 in which the last-mentioned means includes a source of fluid operatively connected to said piston means, and a valve means operatively attached between said source and said piston mechanism to control the flow of fluid thereto.

3. The apparatus in accordance with claim 1 in which the piston shaft means includes a longitudinal slot and a pin member extending through said slot and fixedly attached to the first support member.

4. The apparatus in accordance with claim 1 in which said piston head includes O-ring gaskets at the periphery thereof in slidable and airtight contact with said first member.

5. A method for positioning cylindrical geophones within a subterranean earth formation utilizing an elongated ram having first and second ends, a vertical drive means connected to said first end, a geophone adapter means connected to said second end, and a piston means housed within said adapter, and operatively connected to a source of fluid pressure, said method comprising the steps of
    positioning a cylindrical geophone within said adapter in operative connection with said piston means, said geophone having an outer surface in sliding contact with the side wall of said adapter, and a frusto-conical end surface exterior of and unsupported by said adapter,
    actuating said drive means whereby said geophone adapter and ram undergo vertical movement into the earth in a direction substantially normal to the surface thereof, terminating downward movement of the ram and geophone adapter, with said geophone within said adapter residing substantially within said subterranean earth formation, and imparting movement to said piston means relative to said ram to expel said geophone from said ram, said movement provided by operatively connecting said source of fluid to said piston means through a valve means.

6. The method of claim 5 in which said geophone includes radially extending fin means, each of said fin means having an edge attached to said frusto-conical end surface of said geophone, with the additional step of providing simultaneous rotation and upward vertical movement of said ram after said piston means has expelled said geophone from said ram, whereby said geophone disconnects from said piston means.

7. A geophone adapted for use with a geophone positioning apparatus utilizing an elongated ram connected to a vertical drive means and having a piston means operatively housed therewithin, comprising:

a cylindrical housing having an axis, a shank portion of reduced diameter, and a base portion connected integrally with said shank portion, a cable connected to said housing, said base portion including a frusto-conical end surface and radially extending fin means, each of said fin means having an edge attached to said conical end surface, the joint of said edge and said surface defining a plane substantially coextensive with said housing axis.

8. A method for positioning cylindrical geophones within a subterranean earth formation utilizing an elongated ram, a vertical drive means operatively connected to said ram, a piston means connected to and housed within said ram having a piston rod formed of magnetic material, and an electromagnetic solenoid located about said piston means in selective magnetizably operative contact with said piston rod, said method comprising the steps of positioning a geophone within said ram in operative connection with said piston means, said geophone forming the lead point of the ram, actuating said drive means attached to said ram whereby said geophone and ram undergo vertical movement into the earth in a direction substantially normal to the surface thereof, terminating downward movement of the ram and geophone by deactivating said drive means, said geophone residing substantially within said subterranean earth formation, and imparting movement to said piston means relative to said ram to expel said geophone from said ram by selectively connecting said electromagnetic solenoid to a source of electrical energy whereby said piston rod is magnetically energized to cause movement relative to said ram to expel said geophone from said ram into said subterranean earth formation.

9. A method for positioning cylindrical geophones within a subterranean earth formation utilizing an elongated ram, a vertical drive means operatively connected to said ram, and a piston means connected to and housed within said ram, said method comprising the steps of positioning a geophone within said ram in operative connection with said piston means, said geophone forming the lead point of the ram, actuating said drive means attached to said ram whereby said geophone and ram undergo vertical movement into the earth in a direction substantially normal to the surface thereof, terminating downward movement of the ram and geophone by deactivating said drive means, said geophone residing substantially within said subterranean earth formation, imparting movement to said piston means relative to said ram to expel said geophone from said ram, and actuating said drive means in a reverse mode of operation after said geophone means has been expelled from said ram whereby said ram undergoes upward movement relative to said geophone to disconnect said piston means from said geophone.

10. An apparatus for positioning a geophone in a subterranean earth formation utilizing an elongated ram in which said geophone is supported, and a drive means attached to said ram to position said ram within said subterranean earth formation, the improvement consisting of a piston mechanism operatively engaged to said geophone, said piston mechanism having a piston rod formed of magnetic material, and an actuating means operatively connected to said piston mechanism for selectively providing movement of said piston means relative to said ram to expel said geophone from said ram and into said subterranean earth formation, said actuating means comprising a source of electrical energy, and electromagnetic solenoid means selectively connectable to said source and operatively connected to said piston rod.

References Cited by the Examiner

UNITED STATES PATENTS

| 49,362 | 8/1865 | Barnes et al. | 175—22 |
| 66,887 | 7/1867 | Rider et al. | 175—22 |
| 313,521 | 3/1885 | Powers | 175—22 |
| 1,909,352 | 5/1933 | Hausler et al. | 175—22 |
| 2,244,202 | 6/1941 | Johnson | 340—17 |
| 2,483,770 | 10/1949 | Hildebrandt | 340—17 |
| 2,909,667 | 9/1959 | Schriever | 340—17 |
| 3,038,546 | 6/1962 | Blubaugh et al. | 175—162 |
| 3,186,502 | 6/1965 | Rademacher | 175—67 X |

JACOB L. NACKENOFF, Primary Examiner.

CHARLES E. O'CONNELL, Examiner.

R. E. FAVREAU, Assistant Examiner.